United States Patent
Luszczak et al.

(10) Patent No.: US 11,305,374 B2
(45) Date of Patent: Apr. 19, 2022

(54) METHOD FOR THE PRODUCTION OF A CAST ENGINE BLOCK FOR A COMBUSTION ENGINE AND ENGINE BLOCK

(71) Applicant: Nemak, S.A.B. de C.V., Garcia (MX)

(72) Inventors: Michal Luszczak, Bestwinka (PL); Piotr Kwiatkowski, Skoczow (PL); Adam Pietras, Czerwionka-Leszczyny (PL); Damian Miara, Knurow (PL); Jolanta Matusiak, Gliwice (PL); Jacek Pietrzak, Swietochlowice (PL); Robert Bryk, Gliwice (PL)

(73) Assignee: Nemak, S.A.B. de C.V., Nuevo Leon (MX)

( * ) Notice: Subject to any disclaimer, the term of this patent is extended or adjusted under 35 U.S.C. 154(b) by 0 days.

(21) Appl. No.: 16/335,433

(22) PCT Filed: Sep. 22, 2016

(86) PCT No.: PCT/IB2016/001333
§ 371 (c)(1),
(2) Date: Mar. 21, 2019

(87) PCT Pub. No.: WO2018/055424
PCT Pub. Date: Mar. 29, 2018

(65) Prior Publication Data
US 2019/0210148 A1    Jul. 11, 2019

(51) Int. Cl.
*B23K 20/12* (2006.01)
*F02F 1/10* (2006.01)

(52) U.S. Cl.
CPC .............. *B23K 20/122* (2013.01); *F02F 1/10* (2013.01); *F02F 2001/104* (2013.01)

(58) Field of Classification Search
CPC .............. B23K 20/122–128; B23K 31/02–027
See application file for complete search history.

(56) References Cited

U.S. PATENT DOCUMENTS 5,975,406 A * 11/1999 Mahoney ........... B23K 20/1265
228/112.1
6,253,987 B1 * 7/2001 Coletta ................. B23K 20/12
228/112.1
(Continued)

FOREIGN PATENT DOCUMENTS

DE     19714062 A1    10/1998
EP     2425910 A1     3/2012
(Continued)

*Primary Examiner* — Erin B Saad
*Assistant Examiner* — Carlos J Gamino
(74) *Attorney, Agent, or Firm* — The Webb Law Firm

(57) ABSTRACT

The invention provides a method for easily producing an engine block for a combustion engine. The method includes: a) providing an engine block with an open water jacket opening; b) placing an insert in the water jacket opening; and c) fixing the insert in the water jacket opening by friction welding. The shape of the insert is adapted to the shape of the water jacket opening such that the insert, when being placed, at least partially closes the water jacket opening and bridges the distance between the outer wall and the cylinder wall, thereby supporting the cylinder wall against the outer wall of the engine block. An engine block produced accordingly shows the advantages of a closed deck engine block.

10 Claims, 3 Drawing Sheets

(56) References Cited

U.S. PATENT DOCUMENTS

| | | | |
|---|---|---|---|
| 7,392,771 B2 | 7/2008 | Sunada et al. | |
| 7,954,692 B2 * | 6/2011 | Fukuda | B21J 5/063 |
| | | | 228/112.1 |
| 8,881,964 B2 * | 11/2014 | Ren | B23K 20/1275 |
| | | | 228/112.1 |
| 9,056,370 B1 * | 6/2015 | Matlack | B23K 20/1215 |
| 9,452,491 B1 * | 9/2016 | Littell | F16L 55/13 |
| 2002/0092888 A1 * | 7/2002 | Ezumi | B23K 20/1245 |
| | | | 228/112.1 |
| 2003/0075584 A1 * | 4/2003 | Sarik | B23K 20/122 |
| | | | 228/2.1 |
| 2005/0246884 A1 * | 11/2005 | Chen | A63B 53/047 |
| | | | 29/525 |
| 2006/0213465 A1 | 9/2006 | Sunada et al. | |
| 2009/0261146 A1 * | 10/2009 | Hou | B23K 20/122 |
| | | | 228/112.1 |
| 2010/0078224 A1 * | 4/2010 | Steel | B23K 20/1225 |
| | | | 175/369 |
| 2011/0062219 A1 * | 3/2011 | Bezaire | B23K 20/1215 |
| | | | 228/114 |
| 2012/0022683 A1 * | 1/2012 | Fleming | B23K 20/125 |
| | | | 700/212 |
| 2012/0048502 A1 | 3/2012 | Anzai et al. | |
| 2015/0151479 A1 * | 6/2015 | Neubauer | B23K 20/122 |
| | | | 425/526 |
| 2017/0361395 A1 * | 12/2017 | Tomioka | B23K 20/122 |
| 2021/0162531 A1 * | 6/2021 | Hori | B23K 20/12 |

FOREIGN PATENT DOCUMENTS

| | | | | |
|---|---|---|---|---|
| JP | 2003293850 A | * | 10/2003 | F02F 1/10 |
| JP | 2003293850 A | | 10/2003 | |
| JP | 2014145340 A | * | 8/2014 | |
| JP | 2014145340 A | | 8/2014 | |

* cited by examiner

METHOD FOR THE PRODUCTION OF A CAST ENGINE BLOCK FOR A COMBUSTION ENGINE AND ENGINE BLOCK

CROSS-REFERENCE TO RELATED APPLICATION

This application is the United States national phase of International Application No. PCT/IB2016/001333 filed Sep. 22, 2016, the disclosure of which is hereby incorporated by reference in its entirety.

BACKGROUND OF THE INVENTION

Field of the Invention

The invention relates to a method for the production of a cast engine block for a combustion engine.

The engine block to be produced in accordance with the invention has a deck, at least one cylinder opening and an open water jacket, which is formed into the engine block between a cylinder wall defining the cylinder opening and an outer wall. A contact face is provided on the top of the deck of the engine block to be cast. This contact face is intended for mounting a cylinder head of the combustion engine. The cylinder opening and the opening of the water jacket are formed in the contact face.

The invention also relates to an engine block for a combustion engine designed accordingly.

Description of Related Art

In DE 197 14 062 C2 a method for the production of an engine block is disclosed which includes the step of casting the engine block as an open deck construction and closing the open endings of the water jacket in the deck of the obtained casting with inserts, which are fixed in the respective opening by welding, gluing, wedging or shrinking. In this way the engine block can be easily produced in a common pressure die casting process and shows a stiffness, which corresponds to the stiffness of a closed deck engine block.

The method according to the present invention should especially be suited for the production of engine blocks by using a (High) Pressure Die Casting-Process ("HPDC process").

HPDC is a process, which allows the mass production of high quality engine blocks for vehicle combustion engines. In the HPDC process molten metal is pressed with high pressure in a mold cavity, which is defined in a die of the respective casting machine. The die is usually made of two die halves, the die halves bearing cores, which form openings, recesses and cavities into the casting. Common light metal alloys, such as alloys on the basis of aluminum or magnesium are especially suited for this process.

In common pressure casting the die can also comprise sliders and inserts to reproduce undercuts and other complexly shaped elements. One of these elements is a recess, which forms the water jacket of the engine block. The water jacket surrounds those inner cylinder walls of the cylinder block which define the cylinder openings. In practical use of the engine cooling water flows through the water jacket to remove from the cylinder walls the heat of the combustion occurring in the cylinder opening.

Engine blocks with "closed deck geometry" have a "deck plate", which defines on its free upper side a contact face provided for mounting a cylinder head of the respective engine. The deck plate of engines with closed deck geometry completely closes the water jacket on the upper side of the engine block so that only the cylinder openings and openings for the oil and water supply of the cylinder head are present on the contact face.

One of the advantages of the closed deck design is a high stiffness of the block. This high stiffness is achieved by the support of the cylinder walls provided by the material of the deck plate which bridges the water jacket, thereby bracing the cylinder walls against the outer walls of the engine block. The high stiffness of engine blocks with closed deck allows reducing the thickness of the walls and the total weight of the engine block.

However, casting engine blocks with closed decks is difficult in the HPDC process. Due to the closed deck design, special casting tools are required to form the water jacket in the engine block. The necessity to remove the forming tools after solidification of the block limits the freedom of designing the engine cylinder block.

This disadvantage could principally be removed by using the so called "lost core technology" within the HPDC process. This technology is well established in the field of gravity casting. In gravity casting recesses, channels and cavities, which are surrounded by the walls of the casting are formed by cores, which are destroyed in the course of the de-molding of the casting. Typically, the cores are made from a forming material which is a mixture of a cast sand and an anorganic or organic binder. This forming material is solidified in the core forming process by a chemical ("cold box process") or a thermal ("hot box process") treatment. Practical experiments show, however, that common hot box or cold box sand cores cannot be used in HPDC because of the very high pressure (300-400 bar) with which the melt is fed in the mold.

In EP 2 425 910 A1 and several other publications cores made from salt were recommended as an alternative to cores made from sand. The salt cores are manufactured by the injection of salt (mixture of NaCl, KCl, $Na_2CO_3$, etc.) in a semi-slushy state into the mold of a core forming machine. One essential problem, which arises in this process, is the shrinkage of the salt material, which causes cracks in the cast cores during the solidification. The more complicated the shape—like in case of the water jacket core—the more prone to cracks salt cores are.

Another problem accompanied with the salt core technology is the removal of the cores from the cast after solidification. Usually water is used for rinsing the salt cores out of the casting. However, to ensure a complete removal, the water must be pressed into the cast with high pressure resulting in expensive energy consumption. Furthermore the disposal of the saline water is expensive, because it is supposedly harmful to the environment.

In U.S. Pat. No. 7,392,771 B2 a method for the production of a closed deck-type engine block for a combustion engine is disclosed. In one step of this method a cast engine block is provided. The engine block has a communication hole which is construed to receive a cylinder sleeve that has on the outer peripheral wall of its top end a large diameter portion projected outward along the diameter direction. Under the action of a friction stir welding tool, the cylinder sleeve inserted in the communication hole is joined to the block body with the large-diameter portion in between. By this between the cylinder sleeve and the walls of the engine block surrounding the sleeve in a certain distance a water jacket is formed, which is closed by the large-diameter portion of the sleeve.

Against the background of the state of the art discussed above, the object to be solved by the invention was to provide a method for easily producing an engine block, which shows advantages comparable to the advantages of a closed deck engine block.

Furthermore, an engine block should be designed which has the advantages of an engine block in closed deck design, but can be easily produced by pressure die casting.

SUMMARY OF THE INVENTION

Advantageous embodiments of the method and the engine block according to the invention are specified in the dependent claims and are explained in detail below, as is the general inventive concept.

The method according to the invention is intended for the production of a cast engine block for a combustion engine which has a stiffness similar to the stiffness of engine blocks of the closed deck type, wherein the engine block has a deck, at least one cylinder opening and an open water jacket, which is formed into the engine block between a cylinder wall defining the cylinder opening and an outer wall, a contact face being provided on the top of the deck for mounting a cylinder head of the combustion engine, the cylinder opening and the opening of the water jacket being formed in the contact face.

According to the invention the method for the production of such engine block comprises the following process steps:
  a) providing an engine block, which is preferably cast from a light metal alloy, with an open water jacket opening;
  b) placing an insert in the water jacket opening, the shape of the insert being adapted to the shape of the water jacket opening such that the insert, when being placed, at least partially closes the water jacket opening and bridges the distance between outer wall and the cylinder wall, thereby supporting the cylinder wall against the outer wall, the insert preferably being made of a material being related to the cast material of the engine block;
  and
  c) fixing the insert in the water jacket opening by friction welding.

Corresponding to the method according to the invention, an engine block for a combustion engine has in accordance with the invention a contact face provided for mounting a cylinder head, wherein in the contact face at least one water jacket opening is present which is at least partially closed by an insert placed in the water jacket opening, the insert being fixed in the water jacket opening by friction welding.

Two or more water jacket openings can be present in the contact face, each of the water jacket openings being closed at least partially by an insert fixed in the respective water jacket opening by friction welding, adjacent water jacket openings being separated from each other by fillets formed as an integral part of the engine block.

Hence, similar to the state of the art known from DE 197 14 062 C2, according to the invention an engine block is cast which is designed in the style of an open deck block which has in its contact face an open water jacket opening.

This open deck design engine block, which is provided as the base product of the process according to the invention, can easily be produced in a common HPDC process, using common tools for the forming of the water jacket. After solidification of the cast metal the tools can easily be removed from the cast engine block in a common manner via the open water jacket opening formed in the contact face of the block. Casting and tool removal techniques can be used for this purpose, which are well established in the field of the HPDC production of open deck type engine blocks, so that a reliable production can be effected with high precision and without significant effort.

In the second step of the method according to the invention at least one open water jacket opening is at least partially closed by placing an insert in this opening. The shape of the insert is adapted to the shape of the area of the water jacket opening the insert is assigned to such that the insert fills the space between the cylinder wall and the outer wall bordering the water jacket. Preferably the insert is placed such that its upper face is aligned flush fitting with the contact face of the engine block. By this, the insert forms a bridge after being placed in the water jacket opening. By this bridge the cylinder wall is supported against that outer wall or walls of the engine block which form(s) the outer boundary of the water jacket.

To simplify the fixing of the insert, which is effected according to working step c) of the method according to the invention by friction welding, the insert is preferably made of a material which is related to the cast material of the cast engine block so that an intensive positive substance bonding is easily effected by the friction welding.

To simplify the placing of the insert in the opening, a certain clearance between the outer side faces of the insert and the inner side faces of the water jacket opening can be benefiting.

Practical experiments show that a distinct groove surrounding the insert when being placed in the water jacket opening also has a positive impact on the result of the friction welding process performed after the placing of the insert in the water jacket opening. In this regard, it proves to be advantageous that the outer side faces of the insert or the inner side faces of the water jacket opening are inclined such that after placing the insert in the water jacket opening the width of the groove between the opposite side faces of the insert and the water jacket opening rises from the bottom to the top. The inclination of the respective side face amounts preferably to 0.5° to 10°, an inclination of max. 4° being particularly efficient for most applications. The groove's shape resulting from the inclination effects a favorable local flow of the softened metal in the welding process step. The width of the groove preferably varies between 0.01-0.5 mm.

A secure hold of the insert in the water jacket opening can be easily effected if in a certain area the width of the insert has a slight oversize compared to the width of the water jacket opening area assigned to this area of the insert so that after placing the insert in the opening a little pressure force is acting between the insert and the touching walls of the engine block. By this force the insert is held during the friction welding process so that no additional clamping tools or the like are needed to ensure a precise welding result. This design of the insert is especially favorable if the insert has side faces which are inclined in the manner mentioned above. In this case the oversized area of the insert is preferably present in the foot area of the insert, which means that area which is opposite the insert's upper face assigned to the contact face of the engine block.

After its placement the insert is fixed in the water jacket by friction welding. The main purpose of the welding step is to attach the insert in the opening such that the distance between the walls bordering the water jacket opening are bridged and the cylinder wall is supported against the outer wall of the engine block by the insert. The insert thus acts as a stiffening element, which reinforces the engine block in that area in which the water jacket opening is present so that the engine block according to the invention has a stiffness, which corresponds to the stiffness of a common closed deck engine block.

The friction welding in working step c) of the process according to the invention can be performed as friction spot welding.

Alternatively, the friction welding can be performed as a welding which follows a single track or two or more tracks along the width and/or the length of the water jacket opening. However, to obtain a maximum stiffening effect in the area of the respective water jacket opening it can be favorable to perform the friction welding such that the grooves or gaps being present between the outer peripheral surface of the insert and the inner peripheral surface of the water jacket opening are completely closed.

Friction spot welding is a solid state welding technique, during which the rotation stirring tool is stationary held so that frictional heat is generated at the tool-workpiece interface only in a limited area. If an extensive joint of the insert with the adjacent material of the engine block is sought, common friction stir welding can be used in which the welding tool is moved along a predetermined trace.

In all friction welding techniques the material of the join partners is softened by the frictional heat generated by the friction which results from the relative movement between the rotation stirring tool and the workpiece. The rotating and moving of the friction welding tool causes a material flow by which the material of the adjoining joining partners, i.e. in the present invention the insert and the respective wall of the cylinder block, are mixed. The pressure acting on the plasticized material and mixing of the plasticized material result in the formation of a solid bond region.

Friction spot welding and friction welding performed with a friction welding tool moved perpendicular to the joint line allow much quicker cycle time than a standard welding in which the welding tool is moved along the line of the joint in which the insert contacts with its outer peripheral face the inner peripheral faces of the water jacket opening. Thus, the use of friction spot welding or friction welding with a tool moved as explained above can have a significant impact on production time and costs.

For friction welding a common friction-stirring tool can be used as it is shown, for example, in U.S. Pat. No. 7,392,771 B2. Such a friction stirring tool typically rotates around a rotating axis aligned at a right angle to the contact face, the friction stirring tool having a front face acting against the contact face's border area bordering the water jacket opening and the insert's upper face assigned to the contact face. As also shown in U.S. Pat. No. 7,392,771 B2, on the front face of the friction stirring tool a pin can be placed, which is aligned coaxial to the rotating axis of the friction stirring tool and which dips into the metal of the insert during the friction welding (process step c). The pin intensifies the introduction of the kinetic energy, which is transformed into heat due to the friction contact between the metal of the insert and the material of the engine block surrounding the respective water jacket opening on the one hand and the rotating friction stirring tool on the other hand.

In the event that the diameter of the pin of the friction welding tool used is smaller than the width of the water jacket opening, the friction stirring tool can be moved during the friction welding (process step c) in the direction of the width of the water jacket opening. In this regard it proves to be advantageous with regard to the quality of the welding connection between the insert and the surrounding material of the engine block, if each time the rotating axis of the friction stirring tool crosses the groove between the insert and the contact face's border area bordering the water jacket opening the motion of the friction stirring tool is stopped for a stop interval of at least 0.5 s during which the rotation of the friction stirring tool is continued.

Depending on the extent over which the fixing of the insert in the water jacket opening should be realized the motion of the friction-stirring tool in the width or longitudinal direction of the insert can be continued after a stop interval. The welding can also be done either along the joint line between the insert and cylinder block or perpendicular to it.

In the event that before the stop interval the friction stirring tool was moved from the insert to the contact face's border area, after the stop interval the motion of the friction stirring tool should be continued in a direction opposite to the direction of motion before the stop interval. If, however, before the stop interval the friction stirring tool was moved from the contact face's border area to the insert, then after the stop interval the motion of the friction stirring tool is to be continued in the same direction as before the stop interval. By this course of motion the friction-stirring tool is moved in a zigzag manner across the insert. In doing so, an optimized welding connection between the insert and the surrounding material of the engine block is obtained.

If the insert has an elongated shape, the friction-stirring tool is preferably moved stepwise or continuously in the longitudinal direction of the insert. The longitudinal motion can overlay the motion in the width direction or it can be performed in a separate motion step.

An important advantage of the invention is that it can cost-effectively be industrialized and automated in the serial production. For the implementation of the process according to the invention simple CNC machines are sufficient, which need to have only three motion axis to bear and move the friction welding tool. A specialized welding robot, like it is needed in the prior art to realize the welding, is not required. No need to use specialized equipment means that the process is not only faster and less expensive, but also cheaper.

The placement and fixing of the insert in the water jacket opening can be simplified in that in the contact face's border area bordering the water jacket opening an offset or recess is formed on or in which the insert is supported after being placed in the water jacket opening. By this, no equipment for an aligning of the insert is needed during the welding.

The method according to the invention is especially suited to produce engine block cast from a light metal alloy, preferably an aluminum alloy.

To ensure that the friction welding results in a high quality joint of the insert and the adjoining walls of the engine block without the need of additional effort, the material the insert is made from should be adapted to the material of the engine block such that in the welding zone, in which material of the insert and the engine block is mixed, a homogenous material mixture is formed which ensures a durable and secure hold of the insert in the water jacket opening.

Preferably, the insert is made from the same material as the engine block. If both the insert and cylinder block are made from the same alloy the obtained microstructure of the weld will usually be better than the microstructure of the insert and the cylinder block.

Since in the method according to the invention no filler metal is used for filling the groove between the insert and the surrounding material of the engine block, in the joining area, in which material of the insert and material of the engine block is mixed during welding, a homogenous material mixture is present. Hence, after machining of the contact face of the engine block an ideally polished surface can be obtained for assembling the cylinder head.

The insert can be manufactured either by casting or by cutting from the sheet material. The cutting of the inserts can be performed by laser or water cutting.

In other words, the invention provides a method for reinforcement of a cast engine block by means of at least one insert, preferably two or more inserts, each preferably placed in a recess which is formed in an upper area of the water jacket such that it adjoins the contact surface of the engine block, the insert being adapted in terms of its dimensions to the water jacket opening or the recess formed therein, so that the insert form fittingly sits in the water jacket opening or the said recess after being placed. The fixing of the insert in the water jacket opening is performed by using a friction welding rotating tool which preferably additionally performs a plane motion, the material of the insert and the adjacent walls of the engine block being heated by the movement of the friction welding tool so that the material is plasticized and mixed, thereby forming a positive bonding of the materials. The material welded in this manner quickly solidifies after the rotating tool has passed the respective welding area.

BRIEF DESCRIPTION OF THE DRAWINGS

The invention is explained in more detail below by means of a drawing depicting an exemplary embodiment.

DESCRIPTION OF THE INVENTION

Figure 1:
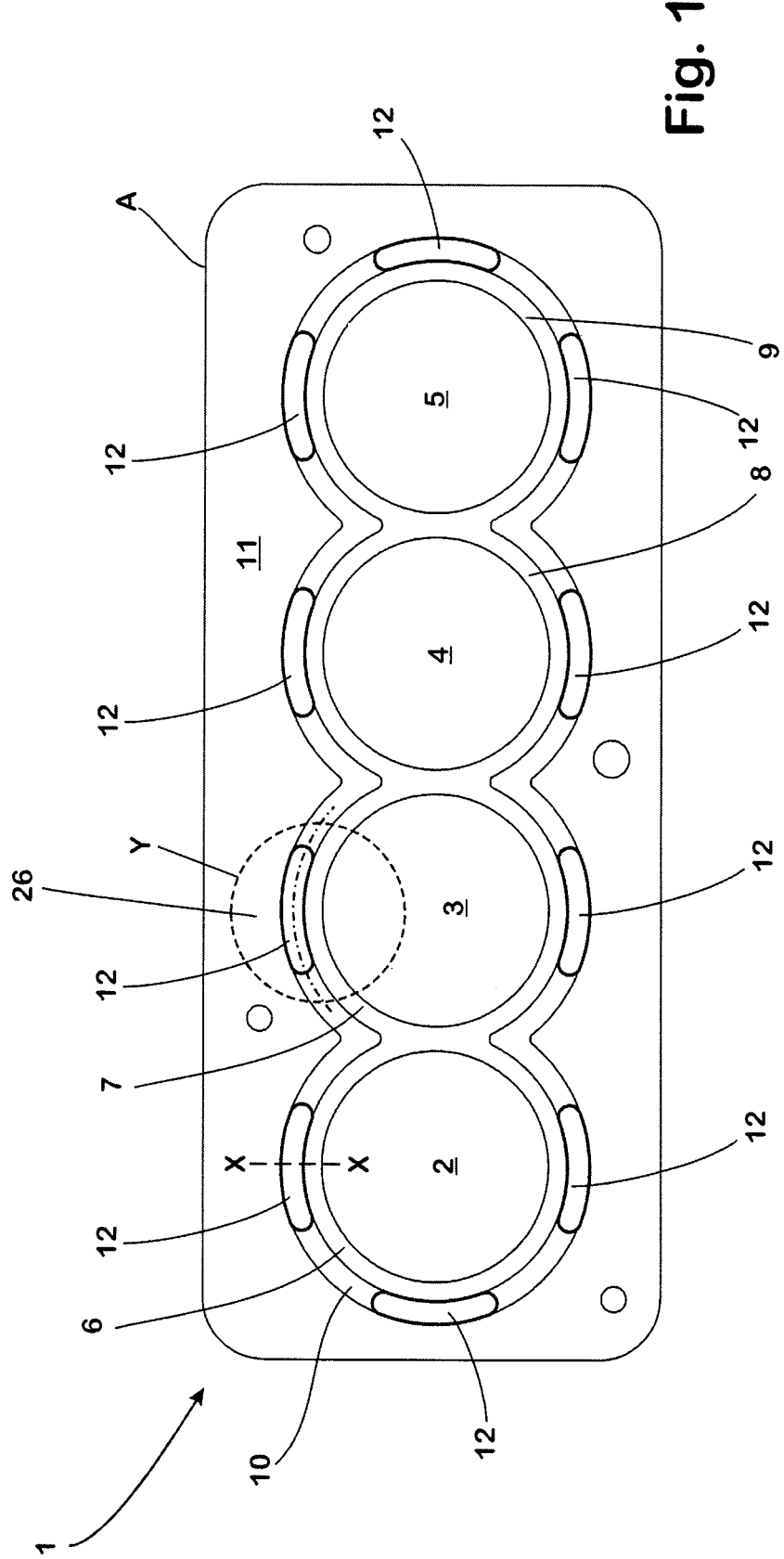
FIG. 1 shows an engine block in a view from above.
Figure 2:
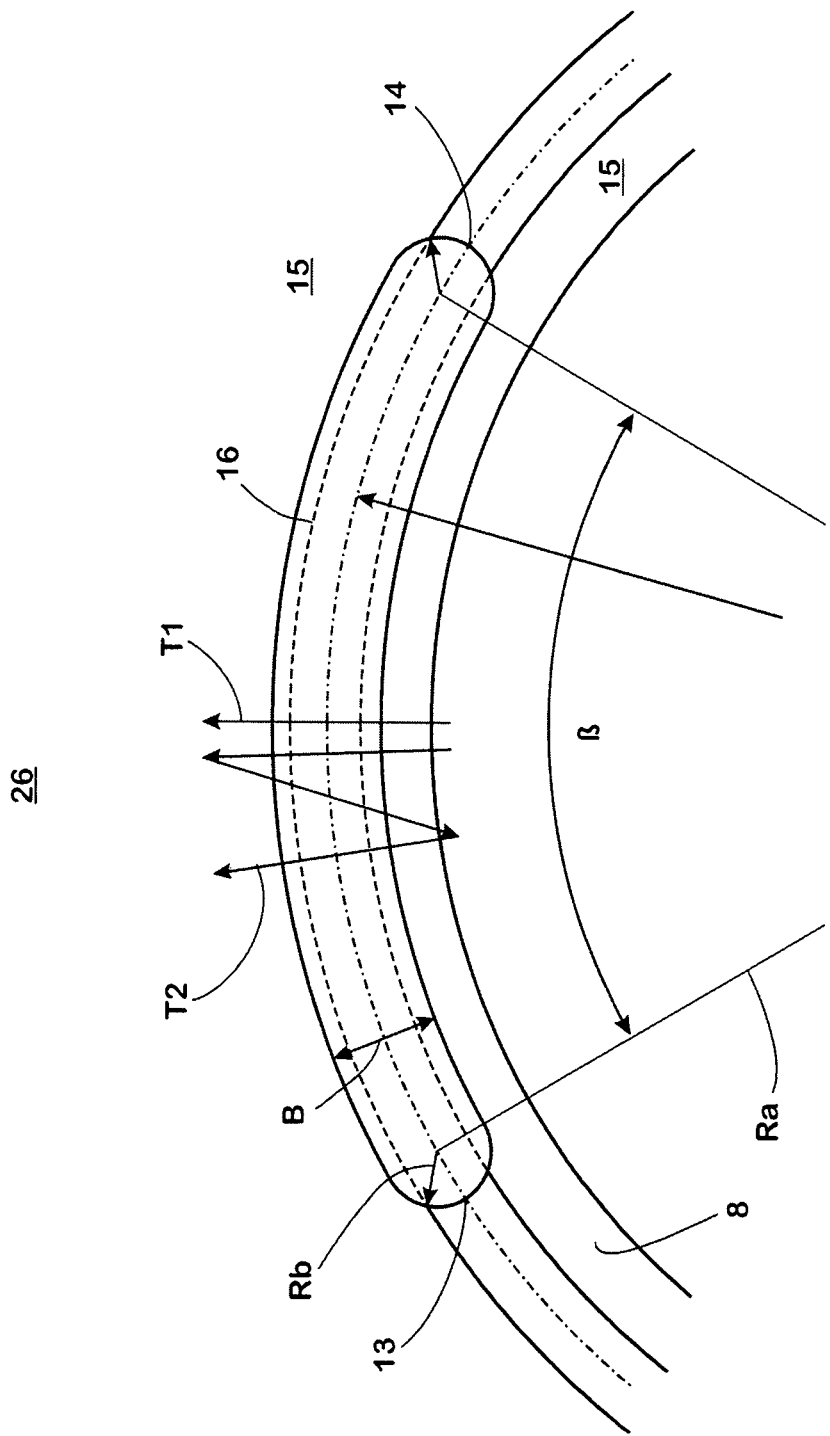
FIG. 2 shows an enlarged section Y of FIG. 1.

FIG. 1 shows an engine block 1 provided as the base product for performing the process according to the invention.

The engine block 1 is cast from a common aluminum cast alloy and is intended for the assembly of a combustion engine, which is not shown further here.

The engine block 1 has four cylinder openings 2, 3, 4, 5 which are aligned in line. Adjacent cylinder openings 2, 3; 3, 4; 4, 5 are separated from each other by cylinder walls 6, 7, 8, 9 which define the respective cylinder openings 2, 3, 4, 5.

An open water jacket 10 is formed in a conventional manner in the engine block 1, the water jacket 10 surrounding the cylinder walls 6, 7, 8, 9.

On the top of the engine block 1 a deck area A is formed. On its upper side the deck area A has a plane contact face 11 in which the cylinder openings 2, 3, 4, 5 and the opening 12 of the water jacket 10 are formed.

Since the water jacket 10 is completely open, the forming tool (not shown), which forms the water jacket in the casting process, can easily be ejected via the water jacket opening 12 after solidification of the engine block 1.

In the contact face's border area 15 bordering the water jacket opening 12 steplike recesses 16 are formed. The distance between the support face 17 of the recess 16 and the contact face 11 amounts to 4-15 mm.

If seen from above (FIG. 1, 2) the shape of the recesses 16 follow the shape of the water jacket 10 which is formed such that it follows the concave form of the cylinder walls 6, 7, 8, 9. The radius Ra of the curvature of the recesses 16 amounts to 20-60 mm. At their small sides 13, 14 the recesses are rounded. The radius Rb of the rounding of the small sides 13, 14 amounts to 4-15 mm. The angle β included between a first straight line, which connects the centre of the curvature of the recesses 16 with the centre of the rounding of the first small side 13 of the respective recess 16, and a second straight line, which connects the centre of the curvature of the respective recess 16 with the centre of the rounding of the second small side 14 of the respective recess 16, amounts to >0-120°.

For partially closing the water jacket openings 12 inserts 20 are provided. The inserts 20 are cast from the same alloy as the engine block 1.

The shape of the inserts 20 is adapted to the shape of the recesses 16 formed in the water jacket opening 12. Accordingly, an insert 20 can respectively be form-fittingly placed in one of the recesses 16.

The side faces 21 of the inserts 20 are inclined such that the inserts 20 taper from their bottom side 22 in the direction of their upper side 23. Furthermore, the size of the inserts 20 is chosen such that they fit into the respective recesses 16 with a small undersize. This allows a simple placement of the inserts 20 in the water jacket openings 12.

Figure 3:
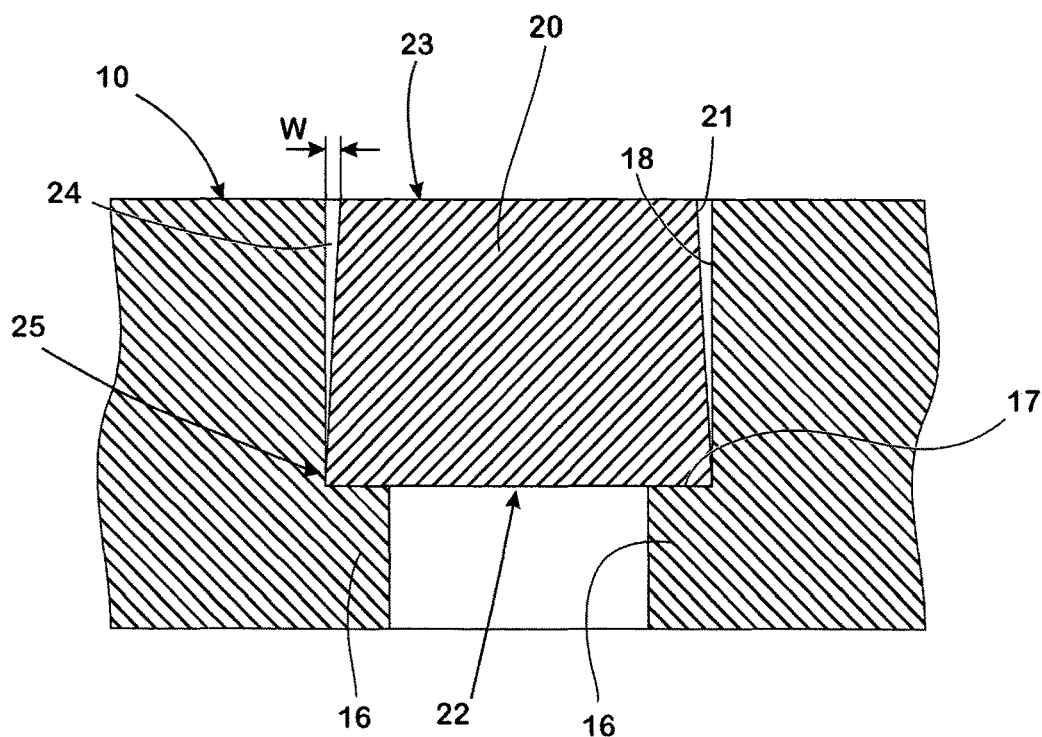
FIG. 3 shows a section of the engine block according to FIG. 1 in a cut along the intersection X-X recorded in FIG. 1.

Due to the inclination of the side faces 21 of the inserts 20 the width W of the groove 24, which exists between the inner side faces 18 of the water jacket openings 12 and the side faces 21 of the inserts 20, widens from the bottom to the top of the groove 24. Due to this and the undersize of the inserts 20 the smallest distance between the side faces 18, 21 at the bottom of the groove 24 is about 0.1 mm, whereas the largest distance at the top of the groove 24 close to the contact face 11 is about 0.4 mm (FIG. 3).

As an alternative to an undersize in the area 25 adjacent to the bottom side 22 of the inserts 20, the inserts 20 can also have a slight oversize in that area 25. If this embodiment is realized, for placing the inserts 20 are pressed in the respective recesses 16 with a little pressure force and, after being placed in this way, are held in the respective recesses 16 under the force of a little pressure acting in the area 25 between the peripheral outer wall of the inserts 20 and the inner wall of the recesses 16. The oversize of the insert's width in the area 25 is adapted to the width of the recess 16 such that on the one hand the pressure force is sufficiently low to enable an easy pressing of the inserts 20 into the respective recesses 16 and on the other hand is sufficiently high to ensure a secure hold of the respective inserts 20 in the assigned recesses 16 during the welding.

The inner side faces 18 of the water jacket openings 12 are aligned perpendicularly to the plane contact face 11.

For fixing the inserts 20 in the water jacket openings 12 a common friction stirring tool 30 is provided which has a cylindrical rotating head 31 with a plane front face 32. In use, the rotating head 31 rotates around a rotating axis D which is aligned perpendicular to the plane contact face 11. On the front face 32 of the friction-stirring tool 30 a pin 33 is placed, which is aligned coaxial to the rotating axis D.

For friction welding, the rotating head 31 rotating around the rotating axis D is pressed with its pin 33 against the border area 15 of the contact face 11 or the upper side 23 of the respective insert 20. Due to the friction force effected by the contact between the pin 33 and the respective surface the kinetic energy of the pin 33 is converted into heat which softens the material getting in contact with the pin 33. As soon as this occurs, the rotating head 31 is lowered so that not only the pin 33 but also the front face 32 of rotating head 31 contacts the respective surface, thereby intensifying the softening process.

The strategy of the friction welding performed with the friction stirring tool 30 depends on the size and the shape of the respective insert and the way the respective insert 20 should be fixed in the respective opening 12 as well.

If only one welding track T1 is needed which is aligned at a right angle to the longitudinal extension of the insert, the stirring tool 30 is initially arranged such that the rotating axis D hits the border area 15 close to the groove 24. After the pin 33 of the tool 30 is dipped into the material of the border area 15 the friction stirring tool 30 is moved perpendicular to the longitudinal direction of the insert 20, i.e. in the direction of the width B of the water jacket opening 12. As soon as the rotating axis D crosses the groove 24 the movement of the tool 30 is interrupted for a stop interval, which last up to 1 second. Then the movement of the tool 30 is continued in the same direction as before until the rotating axis D crosses the groove 24 on the other side of the insert 20. As soon as this happens the movement of the tool 30 is interrupted again for a stop interval of up to 1 second. After this stop interval the welding is finished and the tool 30 is lifted until the pin 33 does no longer contact any material.

To obtain a welding which extends in a larger amount in the longitudinal direction of the insert 20, the movement travers to the longitudinal direction of the insert 20 can be overlaid with a movement in the longitudinal direction. In this case the direction of the movement of the tool 30 is continued after the second stop interval, but with a reversed traverse movement (s. welding track T2). Accordingly, in this embodiment the tool 30 is moved in a zigzag manner across the insert.

As a matter of course, it is also possible to move the friction stirring tool 30 such that it follows the course of the groove 24 to completely and securely close the groove 24.

After welding the water jacket opening 12 is partially closed so that the cylinder walls 8 are supported against the outer walls 26, engine block 1 shows the same stiffness in this area as an engine block, which is directly cast with a closed deck.

Figure 4:
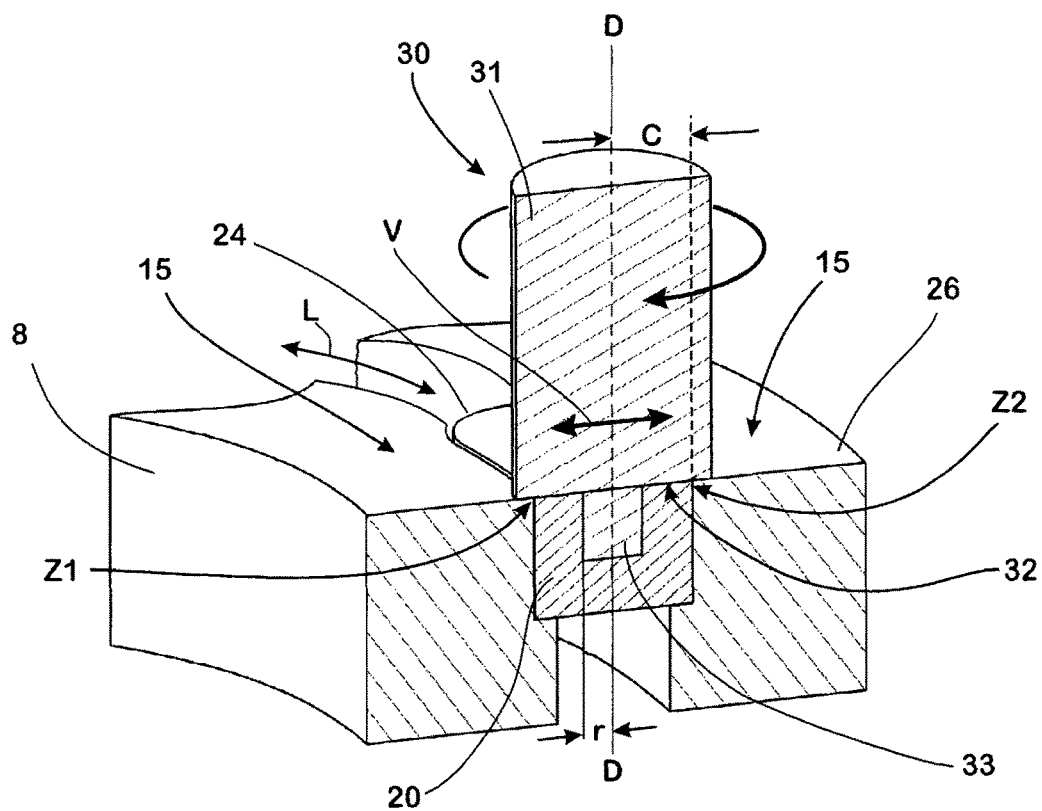
FIG. 4 shows the cut shown in FIG. 3 in a perspective view during friction welding.

The method according to the invention explained above can also be described in a more general manner as follows:

When stir welding is performed the rotating tool 30 with a pin is introduced into the insert 20. Then the tool 30 performs reciprocating motion in the direction V, as indicated in FIG. 4, the direction V aligned perpendicularly to the length extension L of the insert 30.

The main body of the rotating tool 30 has a shape which is adapted to the size of the insert 20 such that in the welding process influence zones Z1, Z2 are established in which material of the insert 20 and the adjacent walls 8, 26 of the engine block are fused, mixed and consolidated, so that a metallic continuity is achieved in the area of the tool's 30 impact, the metallic continuity being sufficient for the efficient immobilization of the insert 20 in the block.

As an alternative or in addition to the use of the rotating tool 30 explained in the preceding paragraph, in practical use the rotating tool with its pin may also be introduced into the material of the walls 8,26 of the engine block 1 adjacent to the insert 20. In this embodiment the tool 30 may also perform a plane motion in the direction V perpendicularly to the contact line (groove 24) between the insert 20 and the adjacent cylinder wall 8 and outer wall 26 by leaving behind in the insert-body 31 influence zones Z1, Z2 in which the plasticized material of the insert 20 and of the respective adjacent wall 8,26 of the engine block 1 is intensively mixed to a positive substance bond. By this substance bond the insert 20 is efficiently fixed, i.e. immobilized, in the recess 16 formed for the insert 20 in the opening 12 of the water jacket 10.

The rotating friction stir tool 30 may be moved in plane motion V with its pin 33 towards the contact face 10 of the engine block until at least the axis D of the tool 33 contacts the insert 20 in the area of the influence zones Z1, Z2. After that the plane motion V is stopped for at least 0.5 s so that friction heating of the material can take place in the respective influence zones Z1, Z2, effected by the rotating tool 30. After the stop interval the tool 30 may again be moved, but now in the opposite direction V.

After completion of the welding as set out before the rotating tool 30 may also be moved outside the contact line (groove 24) between the insert 20 and the respective adjacent wall 18 towards the insert 20 over a distance C which may be less or equal 2×r, wherein "r" is the radius of the pin 33. After this motion the tool 30 can be stopped and be removed from the engine block 1.

As explained in the preceding paragraphs, a clamping force by which the insert 20 is held can be generated in that the groove 24 between the insert and the respective adjacent wall slightly broadens so that if seen in a cross section the insert has a trapezoid shape (s. FIG. 3). By dimensioning the broadened base (area 25) of the insert 20 such that it has a slight oversize with regard to the width of the recess 16 it is to be placed in, it is possible to jam and immobilize the insert 20 in the recess 16 for the time of the welding operation without the need to use any additional clamps or grips.

NUMERALS 1 engine block
2, 3, 4, 5 cylinder openings
6, 7, 8, 9 cylinder walls
10 water jacket
11 plane contact face
12 water jacket openings
13, 14 small sides of the water jacket openings 12
15 border area bordering the water jacket opening 12
16 steplike recess
17 support face
18 inner side faces of the water jacket openings 12
20 insert
21 inclined side faces of the insert 20
22 bottom side of the insert 20
23 upper side of the insert 20
24 groove
25 area of the inserts 12 adjacent to the bottom side 22
26 outer walls of the engine block 1
30 friction stirring tool
31 cylindrical rotating head
32 plane front face of the cylindrical rotating head 31
33 pin of the cylindrical rotating head 31
ß angle
A deck area of the engine block
B width of the water jacket opening 12
C distance
D rotating axis
L length extension
Ra, Rb radius
r radius of pin 33
T1, T2 welding tracks
V Direction of the movement of tool 30
W width of the groove 24
Z1, Z2 influence areas of the friction welding

The invention claimed is:

1. A method for the production of a cast engine block for a combustion engine comprising:
   a) providing a cast block comprising:
      a deck,
      a contact face provided in a top of the deck for mounting a cylinder head of the combustion engine;
      at least one cylinder opening formed in the contact face, and
      a water jacket, which is formed into the cast block between a cylinder wall defining the at least one cylinder opening and an outer wall of the cast block wherein the water jacket has a water jacket opening formed in the contact face of the deck, and the water jacket opening has a width extending between the cylinder wall and the outer wall,
   b) placing an insert in the water jacket opening, the shape of the insert being adapted to the shape of the water jacket opening such that the insert, when being placed, partially closes the water jacket opening and bridges the width of the water jacket opening, thereby supporting the cylinder wall against the outer wall of the cast block;
   and,
   c) fixing the insert in the water jacket opening by friction stir welding,
   wherein support faces extend inwardly from inner side faces of the water jacket opening, and the insert is supported on the support faces,
   wherein an inclination of outer side faces of the insert is different from an inclination of the inner side faces of the water jacket opening such that, after placing the insert in the water jacket opening, a gap is formed between the outer side faces of the insert and the inner side faces of the water jacket opening,
   wherein the gap extends from a bottom of the insert adjacent the support faces to a top of the insert adjacent the contact face and a width of the gap increases from the bottom of the insert to the top of the insert,
   wherein the bottom of the insert is forced into the water jacket opening and the outer side faces at the bottom of insert apply pressure to the inner side faces of the water jacket opening adjacent the support faces,
   wherein the friction stir welding is executed with a friction stirring tool which rotates around a rotating axis aligned at an angle to the contact face, the friction stirring tool having a front face acting against an area of the contact face bordering the water jacket opening and an upper face of the insert that is adjacent to the contact face,
   wherein on the front face of the friction stirring tool a pin is placed, which is aligned coaxial to the rotating axis of the friction stirring tool and which dips into a metal of the insert during the friction welding, and,
   wherein a diameter of the pin is smaller than the width of the water jacket opening and the friction stirring tool is moved during the friction stir welding in a direction of the width of the water jacket opening.

2. The method according to claim 1, wherein, when the rotating axis of the friction stirring tool crosses the gap, a motion of the friction stirring tool is stopped for a stop interval of at least 0.5 s, during which the rotation of the friction stirring tool is continued.

3. The method according to claim 2, wherein after the stop interval, the motion of the friction stirring tool is continued in a direction of the width of the water jacket opening.

4. The method according to claim 3, wherein when a motion of the friction stirring tool before the stop interval is in a direction from the insert to the area of the contact face bordering the water jacket opening, after the stop interval, the motion of the friction stirring tool is continued in a direction opposite to the direction of motion before the stop interval.

5. The method according to claim 3, wherein when a motion of the friction stirring tool before the stop interval is in a direction from an area of the contact face bordering the water jacket opening to the insert, after the stop interval, the motion of the friction stirring tool is continued in the same direction as before the stop interval.

6. The method according to claim 1, wherein during friction welding the friction tool is moved at least stepwise in a longitudinal direction of the water jacket opening.

7. The method according to claim 1, wherein the inner side faces of the water jacket opening in combination with the support face define a recess that receives the insert.

8. The method according to claim 1, wherein an inclination of the respective inclined side face is 0.5° to 10°.

9. The method according to claim 1, wherein the cast block is cast from an aluminum alloy.

10. The method according to claim 1, wherein a width of the bottom of the insert is greater than a width between the inner side faces of the water jacket opening in the area adjacent the support faces.

* * * * *